UNITED STATES PATENT OFFICE.

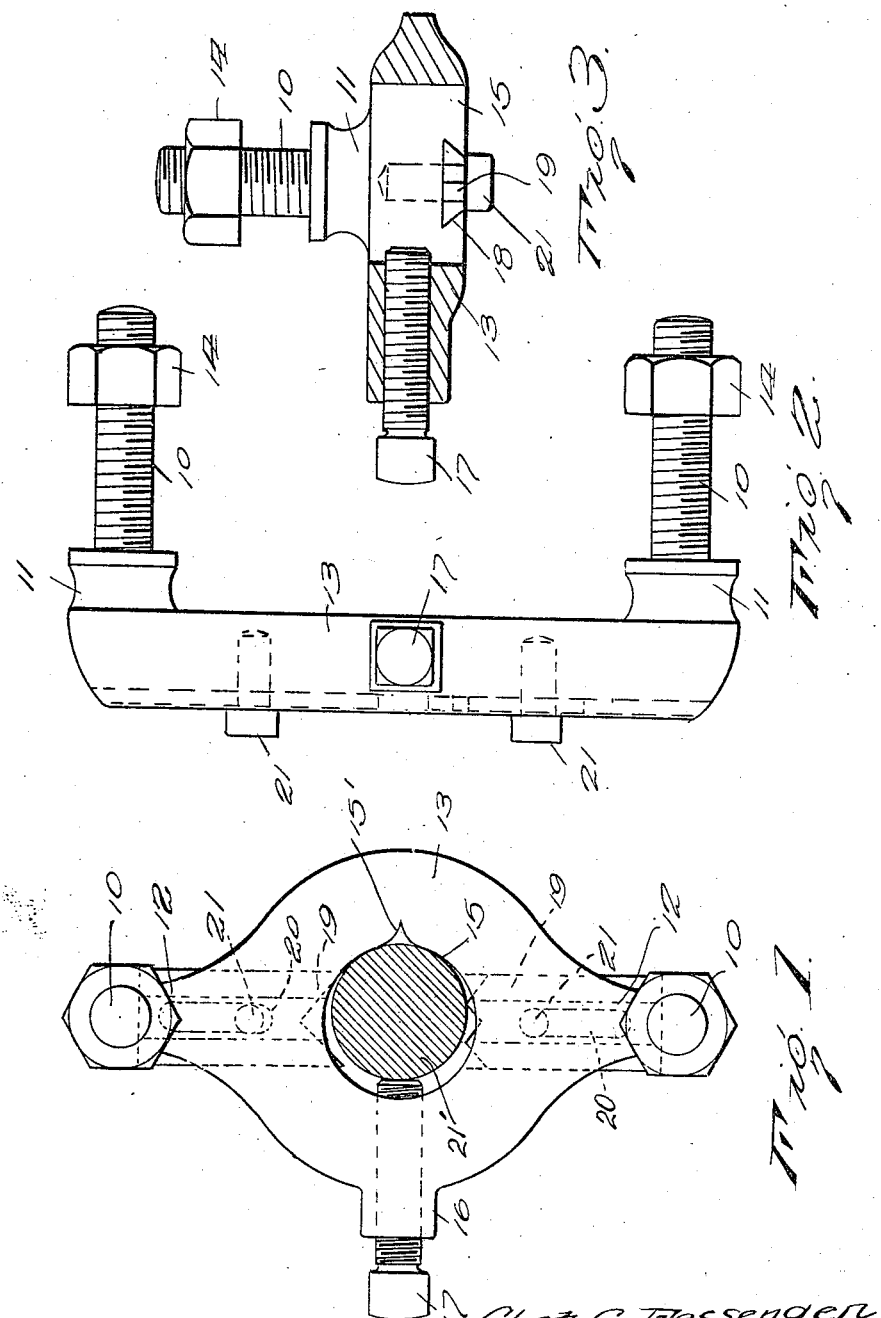

CHET C. FESSENDEN, OF DERBY, CONNECTICUT.

LATHE-DOG.

1,375,499.  Specification of Letters Patent.  Patented Apr. 19, 1921.

Application filed April 29, 1919. Serial No. 293,515.

*To all whom it may concern:*

Be it known that I, CHET C. FESSENDEN, a citizen of the United States, residing at Derby, in the county of New Haven and State of Connecticut, have invented certain new and useful Improvements in Lathe-Dogs, of which the following is a specification.

This invention relates to an improved lathe dog and the principal object of the invention is to provide a lathe dog which may be securely but releasably connected with the face plate of the lathe and which will further be so constructed that an object either round or rectangular in cross section may be securely gripped and held.

Another object of the invention is to so construct this lathe dog that while the work may be securely gripped it can be easily and quickly removed when desired.

Another object of the invention is to provide a lathe dog which will be simple in construction, easy to operate and very efficient in operation.

This invention is illustrated in the accompanying drawings, wherein:

Figure 1 is a view showing the improved dog in front elevation.

Fig. 2 is a view showing the improved dog in side elevation, and

Fig. 3 is a transverse sectional view through the improved dog.

This improved lathe dog is to be releasably connected with the usual face plate of a lathe. In order to connect this dog with the face plate of the lathe there has been provided threaded stems or bolts 10 which extend from the neck 11 carried upon the reduced end portion 12 of the body portion 13. Since the threaded stems 10 are of less diameter than the necks 11 it will be readily seen that the body can be securely clamped to the face plate by the nuts 14. The body 13 of the dog is provided with a central cutout 15 provided with the off-set 15' and in alinement with this off-set 15' there is provided a threaded opening extending through the neck 16 and receiving a set screw 17 by means of which an object which is circular and relatively large in cross section may be engaged and securely clamped in the opening 15. The recess or offset 15' forms gripping shoulders against which the object to be held, when relatively large as indicated at 21', is tightly compressed by the set bolt or screw 17.

The shoulders formed by the recess 15', the set bolt 17, and the clamping blocks 19 thus coact to firmly grip the object to be held and prevented from rotating when the cutting tool is applied. This arrangement will be found of especial value when taking heavy chips from the object which is held by the improved dog. Under cut seats 18 are formed in the body at right angles to the set screw 17 and between the necks 11 and carry clamping blocks 19, thus slidably mounting the clamping blocks so that the inner ends thereof, which are cut as shown in Fig. 2, may be brought into engagement with a piece of metal which is rectangular in cross section. Each of these blocks is provided with a longitudinally extending slot 20 through which extends a set screw 21, the set screws serving to limit longitudinal sliding movement of the blocks and further serving as clamping means whereby the blocks may be securely held in an adjusted position.

When this device is in use it will be connected with the face plate of the lathe by passing the bolts 10 through two of the usual holes or slots in the face plate and screwing the nuts 14 tightly into place, thus tightly clamping the face plate between the necks 11 and the nuts 14. The object to be supported will then be placed in the opening 15 and if this is circular in cross section the stock will be clamped through the medium of the set screw 17 thus securely holding it in place. If the object is rectangular in cross section or of any other shape providing flat side faces the clamping blocks or plates 19 will be moved inwardly to tightly engage the faces of the object and the plates will then be secured by tightening the set screws 21. It will thus be seen that an object of any shape may be secured in the opening 15, and it will be further seen that when it is desired to remove the object it is simply necessary to loosen the fasteners thus releasing pressure from the object and permitting it to be easily removed. It will thus be seen that this improved lathe dog is very simple in construction and easy to operate and further that it is so constructed that it may be associated with a face plate of a conventional construction.

What is claimed is:

A lathe dog having a central opening therethrough and an offset at one side of the opening to provide clamp shoulders, a set screw operating through the body and into the opening and diametrically opposite to the offset, clamp blocks movably engaging the body with object engaging teeth at their contiguous ends, and coacting with the shoulders and set screw.

In testimony whereof, I affix my signature hereto.

CHET C. FESSENDEN.